United States Patent
Hwang et al.

(10) Patent No.: US 11,932,315 B2
(45) Date of Patent: Mar. 19, 2024

(54) FREIGHT VEHICLE ON WHICH DRONES ARE DOCKED AND METHOD OF CONTROLLING LOGISTICS SYSTEM USING SAME

(71) Applicants: Hyundai Motor Company, Seoul (KR); Kia Corporation, Seoul (KR); Yong San Co., Ltd., Ulsan (KR)

(72) Inventors: Jin Ho Hwang, Cheonan-Si (KR); Sang Heon Lee, Seoul (KR); Dong Eun Cha, Hwaseong-Si (KR); Choon Taik Kim, Yongin-Si (KR); Sang Hoon Lee, Asan-Si (KR); Hong Kwon Moon, Cheonan-Si (KR)

(73) Assignees: Hyundai Motor Company, Seoul (KR); Kia Corporation, Seoul (KR); Yong San Co., Ltd., Ulsan (KR)

( * ) Notice: Subject to any disclaimer, the term of this patent is extended or adjusted under 35 U.S.C. 154(b) by 0 days.

(21) Appl. No.: 17/894,530

(22) Filed: Aug. 24, 2022

(65) Prior Publication Data

US 2023/0249761 A1     Aug. 10, 2023

(30) Foreign Application Priority Data

Feb. 4, 2022   (KR) ........................ 10-2022-0015121

(51) Int. Cl.
*B62D 3/08*   (2006.01)
*B62D 33/08*   (2006.01)
*B64C 39/02*   (2023.01)
*B64F 1/00*   (2006.01)
*B64F 1/32*   (2006.01)
*B64U 80/86*   (2023.01)
(Continued)

(52) U.S. Cl.
CPC ............ *B62D 33/08* (2013.01); *B64C 39/024* (2013.01); *B64F 1/007* (2013.01); *B64F 1/32* (2013.01); *B64U 80/86* (2023.01); *B64U 2101/60* (2023.01); *B64U 2101/64* (2023.01)

(58) Field of Classification Search
CPC . B64F 1/007; B64F 1/32; B64D 33/08; B64U 2101/64; B64U 80/86
See application file for complete search history.

(56) References Cited

U.S. PATENT DOCUMENTS 9,915,956 B2 *   3/2018   Bokeno ................ B64C 39/024
9,928,474 B1 *   3/2018   Evans .................. G06Q 10/083
(Continued)

FOREIGN PATENT DOCUMENTS

JP           6908937       7/2021
KR    10-2017-0074369      6/2017
(Continued)

*Primary Examiner* — Richard G Davis
(74) *Attorney, Agent, or Firm* — MORGAN, LEWIS & BOCKIUS LLP

(57) ABSTRACT

A freight vehicle on which a drone is docked, may include: a transfer device provided in the vehicle and configured to move up and down between an internal space of the vehicle and a roof to receive freight from the drone through the roof of the vehicle or transfer freight to the drone; and a load-space separated, as a portion of the internal space of the vehicle, from a space where the transfer device is provided and including an open portion formed on a side or a rear of the vehicle, and onto which the freight is loaded.

18 Claims, 10 Drawing Sheets

(51) Int. Cl.
*B64U 101/60* (2023.01)
*B64U 101/64* (2023.01)

(56) References Cited

U.S. PATENT DOCUMENTS

| | | | |
|---|---|---|---|
| 10,474,983 B2 * | 11/2019 | High | G06Q 10/0833 |
| 10,730,621 B2 | 8/2020 | Goovaerts et al. | |
| 10,993,569 B2 | 5/2021 | Gil et al. | |
| 11,748,688 B2 * | 9/2023 | Ur | B64C 39/024 |
| | | | 705/332 |
| 2016/0364989 A1 * | 12/2016 | Speasl | G08G 5/0082 |
| 2017/0316701 A1 * | 11/2017 | Gil | B64U 10/16 |
| 2019/0161190 A1 * | 5/2019 | Gil | B65G 1/0435 |
| 2021/0197982 A1 * | 7/2021 | Sweeny | B64F 1/222 |
| 2022/0108273 A1 * | 4/2022 | Miyata | G08G 5/0034 |

FOREIGN PATENT DOCUMENTS

| | | | | |
|---|---|---|---|---|
| WO | WO2017/029611 | 2/2017 | | |
| WO | WO-2023057450 A1 * | 4/2023 | | B64F 1/228 |

* cited by examiner

FREIGHT VEHICLE ON WHICH DRONES ARE DOCKED AND METHOD OF CONTROLLING LOGISTICS SYSTEM USING SAME

CROSS-REFERENCE TO RELATED APPLICATION(S)

The present application claims priority to Korean Patent Application No. 10-2022-0015121, filed on Feb. 4, 2022, the entire contents of which is incorporated herein for all purposes by this reference.

BACKGROUND OF THE PRESENT DISCLOSURE

Field of the Present Disclosure

The present disclosure relates to a freight vehicle on which a drone docks to deliver freight of a freight vehicle using a drone, and a method of controlling a logistics system using the same.

Description of Related Art

Recently, various types of product delivery services such as parcel delivery, pizza delivery, and the like have been provided, and among them, the most representative example of the product delivery services is a parcel delivery service.

An existing parcel delivery system is operated such that a delivery person loads delivery goods on a delivery vehicle and visits respective delivery locations to deliver the goods.

However, in the case of the existing parcel delivery system, theft often occurs in the delivery vehicle while the delivery person leaves the delivery vehicle to deliver the delivery goods.

Furthermore, in the case of rural areas, since the households are located separately in a wide area, the delivery vehicle must visit the households one by one so that the efficiency of parcel delivery is significantly lowered, compared to an apartment complex in which a large number of households are located in one building.

As a method to solve these problems, introduction of a service of delivering goods using drones is under discussion. However, in the case of the parcel delivery service using drones, countermeasures for safety problems that occur when a flying drone crashes have not yet been prepared.

The drone must frequently communicate with the outside for setting a destination or transmitting its own status through communication with the outside, but if the drone is hacked by a radio signal received from the outside, the path of the drone may be arbitrarily set, such that the delivery goods or the drone may be lost, or there is also a high risk that drones may be used for illegal purposes such as crashing the drone into a random target.

Therefore, the security issue for drones is important as much as the safety issue in preparation for the crash of the drone.

To solve the present problem, a freight vehicle is required to transport freight to a predetermined area and then deliver the freight by a drone.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to moving freight inside to the entrance by sliding a floor panel in a loadspace for loading the freight on the freight vehicle, so that a delivery driver can easily withdraw or load the freight, transferring the withdrawn freight to the roof and then to a drone docked on the roof, and delivering the freight through the drone.

A freight vehicle on which a drone is docked according to the present disclosure may include: a transfer device provided in the vehicle and configured to move up and down between an internal space of the vehicle and a roof to receive freight from the drone through the roof of the vehicle or transfer freight to the drone; and a loadspace separated, as a portion of the internal space of the vehicle, from a space where the transfer device is provided and including an open portion formed on a side or a rear of the vehicle, and onto which the freight is loaded.

The loadspace may be divided into a plurality of spaces by partitions, and an open portion may be formed on the side or rear of the vehicle in each space.

The partitions may include a first partition extending in a horizontal direction of the vehicle to form the space in which the transfer device is provided and a second partition spaced from the first partition in a front and rear direction of the vehicle and extending in the horizontal direction of the vehicle, and the loadspace may include a first space formed between the first partition and the second partition and including an open portion formed on the side of the vehicle, and a second space partitioned by the second partition and extending toward the rear of the vehicle to have an open portion formed on the rear of the vehicle.

The freight vehicle may further include a sliding panel including a transfer panel provided to be slidable to the inside of the loadspace on a bottom thereof, a fixed panel provided on the bottom adjacent to the open portion, and a first actuator configured to slide the transfer panel to an upper portion of the fixed panel to overlap the fixed panel.

A support wall extending upwards may be provided at an internal end portion of the transfer panel, and when the transfer panel slides, the support wall may be moved together with the transfer panel to move the freight on the transfer panel.

The first actuator may include a first belt extending in a direction in which the transfer panel slides, a first pulley coupled to first and second end portions of the first belt, a first driving motor configured to rotate the first pulley, and a connection portion connecting the first belt and the transfer panel.

The sliding panel may include a guide rail provided under the transfer panel and extending to the open portion, and a guide portion slidably connected to the guide rail and including a top portion coupled to the transfer panel, and the guide portion may be connected to the first actuator to slide the transfer panel.

A plurality of transfer panels may be provided side by side, a plurality of guide portions may be provided to correspond to a number of the transfer panels, a guide portion located far from the open portion may have a greater height as much as a thickness of the transfer panel, and a plurality of first actuators may be provided to be respectively connected to the guide portions so that the guide portions move independently to overlap each other.

The transfer device may include a driving rail extending in the vertical direction, a support panel slidably connected to the driving rail and supporting the freight to move in the vertical direction, and a second actuator configured to move the support panel along the driving rail.

The second actuator may include a second belt extending in a direction in which a second rail extends, a second pulley coupled to first and second end portions of the second belt, a second driving motor configured to rotate the second pulley, and a second connection portion connecting the second belt and the support panel.

The freight vehicle may further include a drone docking station connected to an upper end portion of the transfer panel, mounted on the roof of the vehicle so that the drone is accommodated thereon, including a plurality of panels surrounding the transfer device, and configured to slide inwards or outwards and rotate around a center portion of the drone docking station.

The drone docking station may include a base panel of which a center portion thereof is connected to the transfer device and connected to a roof panel of the vehicle to rotate about the transfer device, and guide panels, on which the drone is accommodated, configured as a plurality of panels and connected to the upper portion of the base panel to slide outwards.

The drone docking station may include a first driving device configured to rotate the base panel and a second driving device configured to slide the guide panel.

A method of controlling a logistics system using a freight vehicle on which the drone is docked according to the present disclosure may include the steps of: transmitting delivery vehicle information, freight information, or a docking position of the vehicle from a server to the drone; identifying matching between the drone and the vehicle; docking the drone on transfer device of a roof of the vehicle; and elevating the transfer device of the vehicle to the roof of the vehicle if the matching between the drone and the vehicle is identified.

The method may further include a step of aligning the drone by controlling a drone docking station so that the drone corresponds to a position of freight transferred by the transfer device after the docking step.

The method may further include the steps of: identifying whether freight information received from the drone after the docking step matches the transmitted freight information; and loading freight onto the drone when the received freight information and the transmitted freight information match each other in identifying the matching between the received freight information and the transmitted freight information.

The freight vehicle on which the drone is docked according to an exemplary embodiment of the present disclosure may move freight inside a loadspace where the freight is loaded toward the entrance through a sliding panel provided on the floor of the loadspace, so that a delivery driver can load the freight into the inside of the loadspace without entering the loadspace, obtaining an effect of preventing injury to the delivery driver and reducing the time for loading and withdrawing the freight.

Furthermore, there is an effect of enabling the delivery driver to easily transfer the freight withdrawn from the loadspace to a drone docking station provided on a roof of a vehicle through the drone docking station provided on the roof and a transfer device connected to the drone docking station to transfer the freight to the roof, rapidly delivering the freight through the drone.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
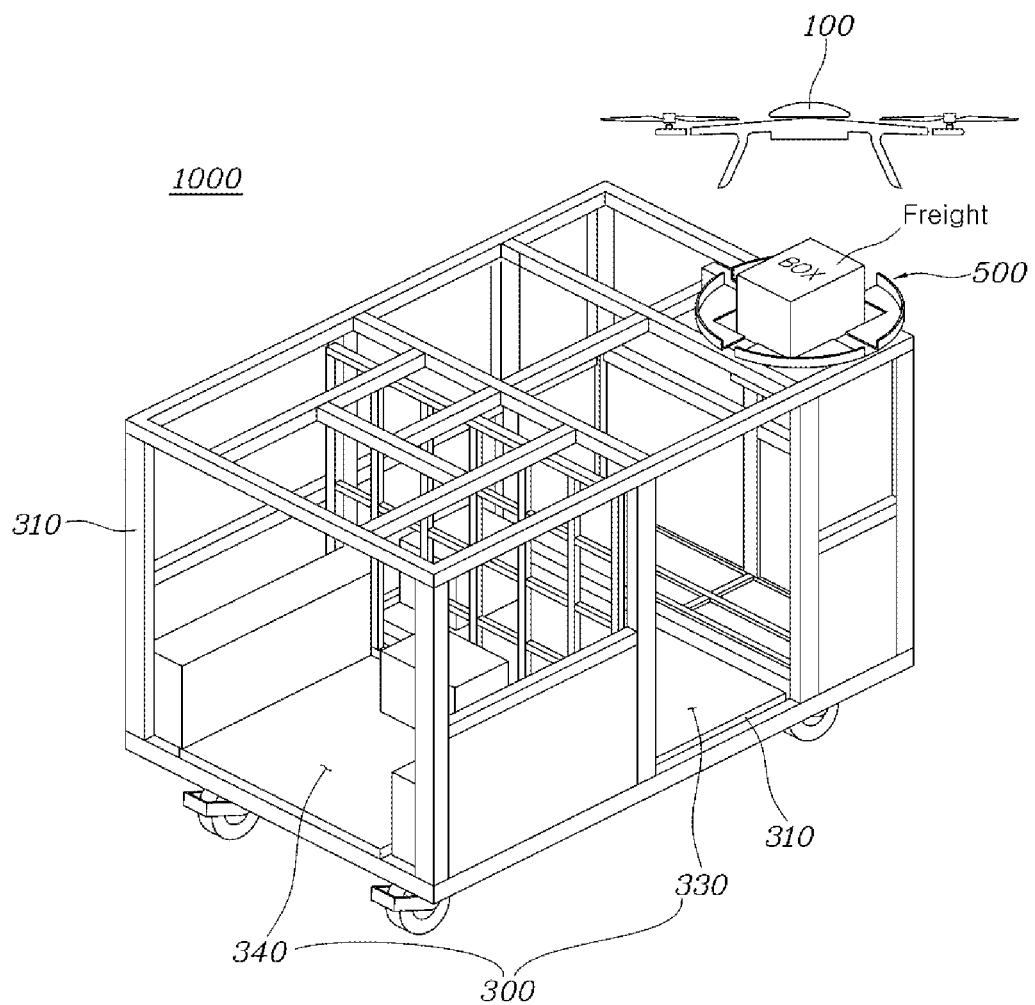
FIG. 1 is a perspective view of a freight vehicle on which a drone is docked according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A specific structural or functional description of embodiments of the present disclosure set forth in the specification or application is provided merely for describing the exemplary embodiment of the present disclosure. Therefore, the exemplary embodiments of the present disclosure may be implemented in various forms, and the present disclosure should not be construed as being limited to the embodiments described in the specification or application.

Various changes and modifications may be made to the embodiments according to an exemplary embodiment of the present disclosure, and therefore various exemplary embodiments will be illustrated in the drawings and described in the specification or application. However, it should be understood that embodiments according to the concept of the present disclosure are not limited to the particular disclosed exemplary embodiments of the present disclosure, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, various exemplary embodiments of the present disclosure will be described in detail with reference to the accompanying drawings. Similar or like reference signs presented in the respective drawings designate similar or like elements.

Figure 2:
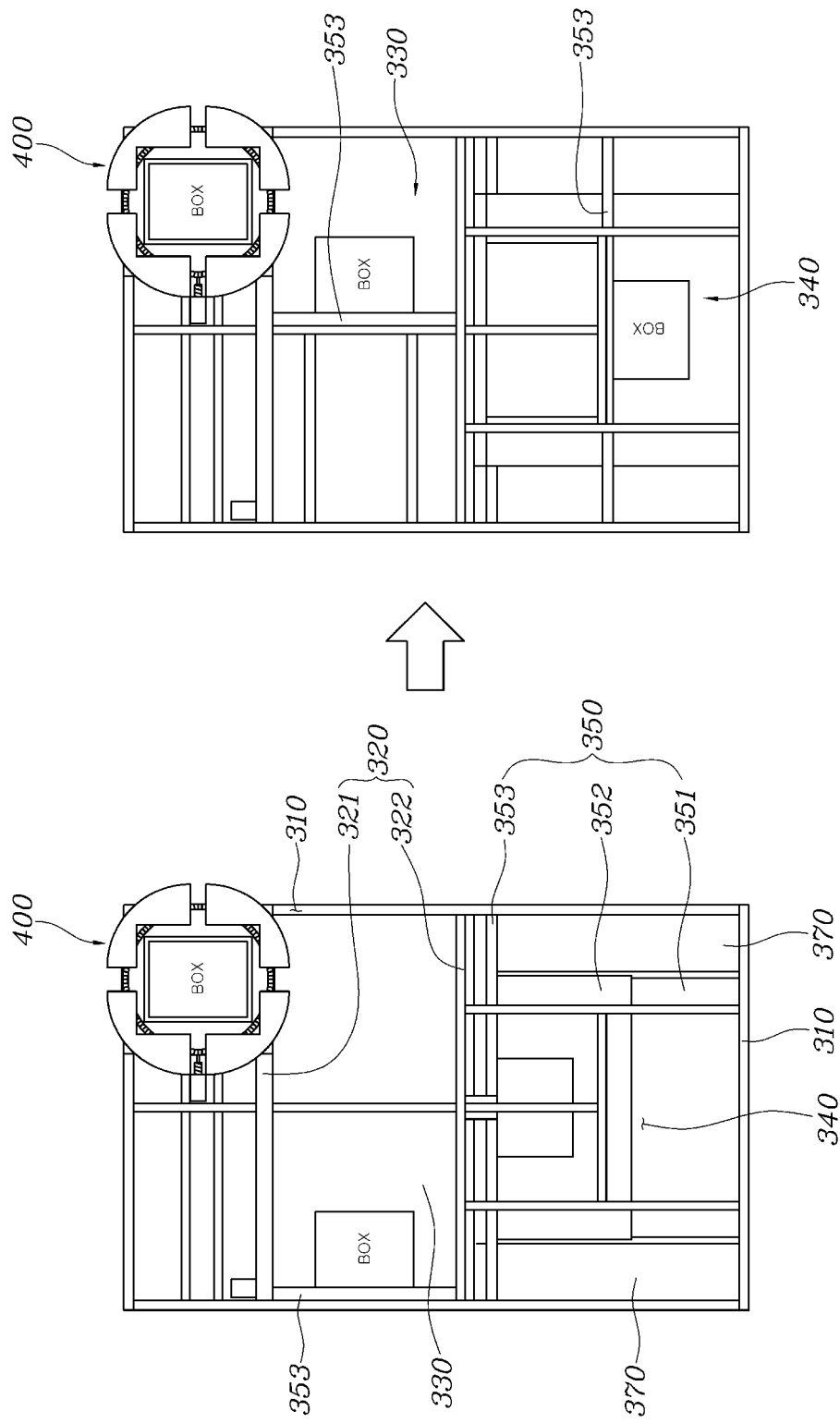
FIG. 2 is a plan view exemplarily illustrating the operation of a sliding panel provided in a loadspace of a freight vehicle on which a drone is docked according to an exemplary embodiment of the present disclosure.
Figure 3:
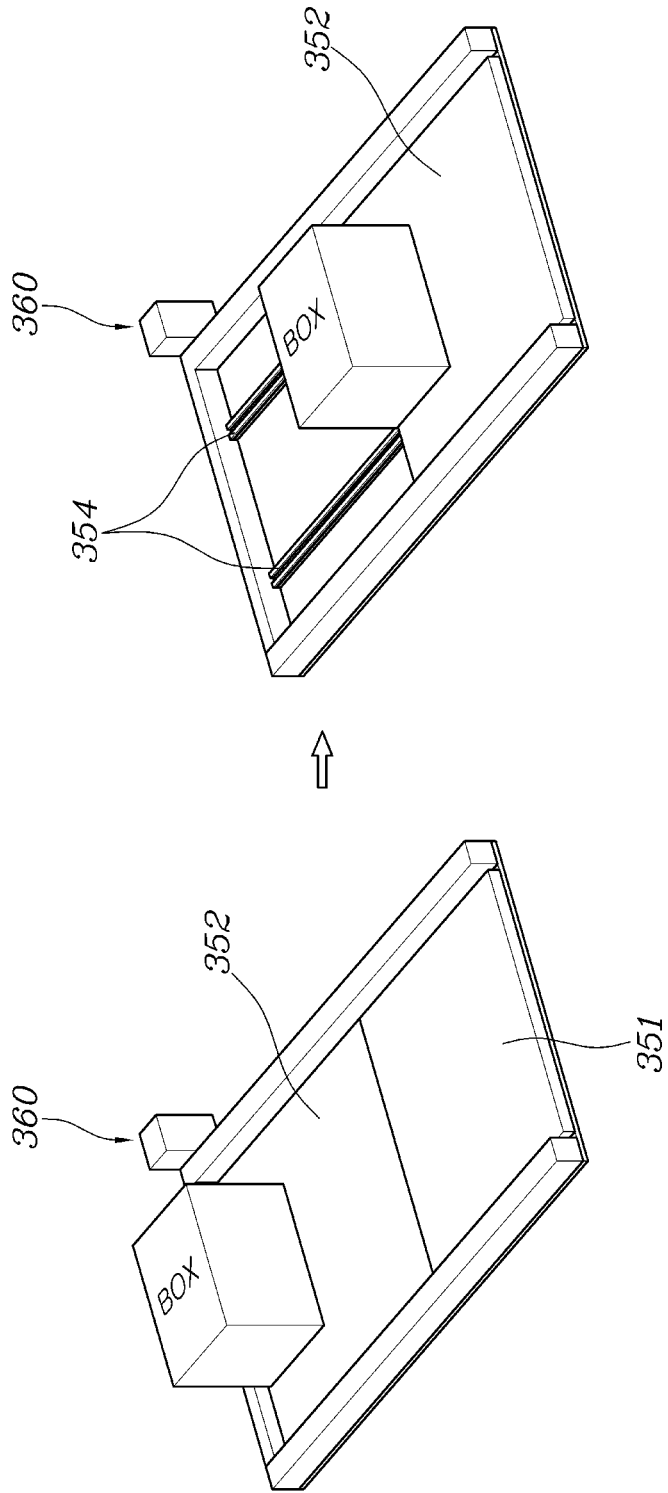
FIG. 3 is a perspective view exemplarily illustrating the operation of a sliding panel provided in a loadspace of a freight vehicle on which a drone is docked according to an exemplary embodiment of the present disclosure.
Figure 8:
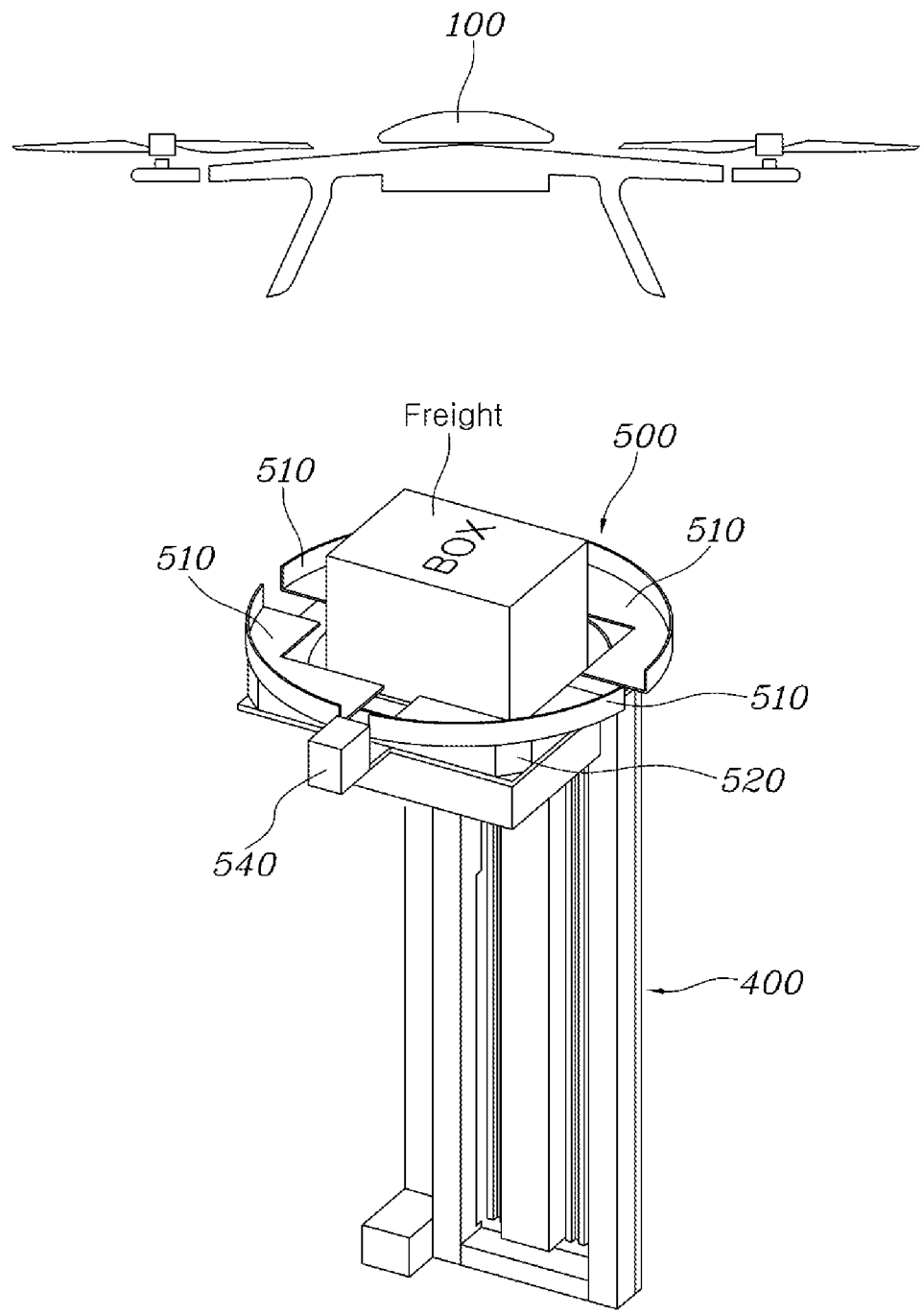
FIG. 8 is a perspective view of a drone station and a transfer device of a freight vehicle on which a drone is docked according to an exemplary embodiment of the present disclosure.

FIG. 1 is a perspective view of a freight vehicle 1000 on which a drone 100 is docked according to an exemplary embodiment of the present disclosure. FIG. 2 is a plan view exemplarily illustrating the operation of a sliding panel provided in a loadspace 300 of a freight vehicle 1000 on which a drone 100 is docked according to an exemplary embodiment of the present disclosure. FIG. 3 is a perspective view exemplarily illustrating the operation of a sliding panel provided in a loadspace 300 of a freight vehicle 1000 on which a drone 100 is docked according to an exemplary embodiment of the present disclosure. FIG. 8 is a perspective view of a drone station and a transfer device 400 of a freight vehicle 1000 on which a drone 100 is docked according to an exemplary embodiment of the present disclosure.

An exemplary embodiment of a freight vehicle 1000 on which the drone 100 is docked according to an exemplary embodiment of the present disclosure will be described with reference to FIG. 1, FIG. 2, and FIGS. 3 and 8.

Recently, purpose built vehicles (PBVs) have been manufactured according to the purposes of the vehicles.

Accordingly, a freight vehicle 1000 for transporting freight, among the purposes of the vehicles, may be manufactured, and the present disclosure relates to technology of, to deliver freight loaded on a freight vehicle 1000 to a customer through a drone 100, providing the vehicle with a device for docking the drone 100 to the vehicle, and separating the device for docking the drone 100 from a space for loading the freight, transferring the freight of the loadspace to the device where the drone 100 is docked through a transfer device, delivering the freight to the customer.

The freight vehicle 1000 on which the drone 100 is docked according to an exemplary embodiment of the present disclosure includes: a transfer device 400 configured to move up and down between an internal space of a vehicle and a roof thereof to receive freight from the drone 100 through the roof of the vehicle or transfer freight to the drone 100; and a loadspace 300, as a portion of the internal space of the vehicle, separated from the space where the transfer device 400 is provided and including an open portion 310 formed on the side or rear of the vehicle to load the freight.

As shown in FIG. 1, FIG. 2, and FIG. 3, the freight vehicle 1000 may transfer freight from the lower portion of the vehicle to the roof or from the roof of the vehicle to the lower portion through the transfer device 400 configured to moving the freight up and down. In the instant case, the upper end portion of the transfer device 400 may be connected to the roof of the vehicle, and the drone 100 may be docked on the upper end portion of the transfer device 400.

Through this, a transport driver may move the freight loaded in the loadspace 300 of the vehicle to the transfer device 400, transferring the same to the roof of the vehicle, so that the freight may be loaded on the drone 100 docked on the roof of the vehicle or so that the freight received from the drone 100 may be transferred from the roof of the vehicle to the lower portion thereof.

Furthermore, a loadspace 300 for loading freight on the vehicle may be provided separately from the space where the transfer device 400 is provided, and the loadspace 300 may have an open portion 310 formed to be provided on the side of the vehicle or on the rear of the vehicle so that a delivery driver of the freight vehicle 1000 may withdraw the freight of the vehicle through the open portion 310, transfer the freight to the roof of the vehicle through the transfer device 400, and then load the freight on the drone 100.

Through this, the transfer device 400 for transferring the freight to the roof may be provided in the vehicle provided with the loadspace 300 where the freight is loaded, and the drone 100 may be docked onto the upper end portion of the transfer device 400, which provides an effect of rapidly deliver the freight of the vehicle to a customer through the drone 100.

The loadspace 300 may be partitioned into a plurality of spaces by partitions 320, and each space may have an open portion 310 formed on the side or rear of the vehicle.

The loadspace 300 may be provided with partitions 320 to be separated from the space in which the transfer device 400 is provided. A plurality of partitions 320 may be formed to partition the loadspace 300 of the vehicle into a plurality spaces, efficiently loading the freight on the vehicle.

Hereinafter, the structure of the vehicle shown in FIG. 1 and FIG. 2 will be referred to as an exemplary embodiment of the partitions 320, and the partitions 320 may be provided in various ways.

The partitions 320 may include a first partition 321 extending in the horizontal direction of the vehicle to form a space in which the transfer device 400 is provided, and a second partition 322 spaced from the first partition 321 in the front and rear direction of the vehicle and extending in the horizontal direction of the vehicle, and the loadspace 300 may include a first space 330 formed between the first partition 321 and the second partition 322 and including an open portion 310 formed on the side of the vehicle, and a second space 340 partitioned by the second partition 322 and extending toward the rear of the vehicle to have an open portion 310 formed on the rear of the vehicle.

As shown in FIGS. 1 to 2, the first partition 321 may separate between the space in which the transfer device 400 is provided and the loadspace 300, and the second partition 322 is provided to be spaced from the first partition 321 toward the rear of the vehicle so that the first space 330 may be provided between the first partition 321 and the second partition 322 to extend in the horizontal direction of the vehicle and have the open portion 310 formed on the side of the vehicle and so that the second space 340 may be provided to extend from the second partition 322 to the rear and have an open portion 310 formed on the rear.

The first space 330 and the second space 340 are an exemplary embodiment obtained by partitioning the loadspace 300 using the partitions 320, and the partitions 320 may be formed in various ways to form the loadspace 300 in various shapes.

Delivery driver may classify and load freight on the loadspace 300 divided into the first space 330 and the second space 340 at their discretion, and in an exemplary embodiment of the present disclosure, may classify the freight depending on the delivery sequence or size of the freight and then load the same into the first space 330 and the second space 340.

A sliding panel 350 including a transfer panel 352 provided to be slidable to the inside of the loadspace 300 on a bottom thereof, a fixed panel 351 provided on the bottom adjacent to the open portion 310, and a first actuator 360 for sliding the transfer panel 352 to the upper portion of the fixed panel 351 to overlap the same may be further included.

A sliding panel 350 may be provided in the loadspace 300. The loadspace 300 is separated from the space where the transfer device 400 is provided so that freight may be loaded in the loadspace 300. In the present structure, the floor panel may slide from the inside of the loadspace 300 to the open portion 310.

The sliding panel 350 may include a fixed panel 351 divided into a plurality of panels and fixed to the open portion 310, a transfer panel 352 provided inside the loadspace 300 to slide onto the fixed panel 351, and a first actuator 360 for sliding the transfer panel 352, so that the floor panel inside the loadspace 300 may slide toward the open portion 310.

A lower portion of the fixed panel 351 may be supported by ball rollers 357.

Through this, when a delivery driver of the freight vehicle 1000 loads all freight into the loadspace 300 and withdraws the loaded freight to transfer the same to the drone 100 through the transfer device 400, the delivery driver may withdraw all the freight located on the fixed panel 351 and slide the transfer panel 352 to transfer the same to the open portion 310, so that the delivery driver does not have to go into the loadspace 300, rapidly withdrawing the freight from the loadspace 300 and moving the same to the transfer device 400. Furthermore, because the delivery driver does not need to perform an operation that places a burden on the back such as bending his back to enter the loadspace 300, there is an effect of preventing the delivery driver from being injured.

A support wall 353 extending upwards may be provided at an internal end portion of the transfer panel 352, and when the transfer panel 352 slides, the support wall 353 moves together to move the freight on the transfer panel 352.

As shown in FIG. 2 and FIG. 3, a support wall 353 extending upwards may be provided at an internal end portion of the transfer panel 352 and may slide toward the open portion 310 together with the transfer panel 352.

The support wall 353 may be provided to prevent the freight loaded on the transfer panel 352 from sliding together with the transfer panel 352 when the transfer panel 352 slides.

When the transfer panel 352 slides to the open portion 310, the support wall 353 supports the freight at the rear in a direction in which the transfer panel 352 moves, so that the freight may be stably moved to the open portion 310.

Figure 4:
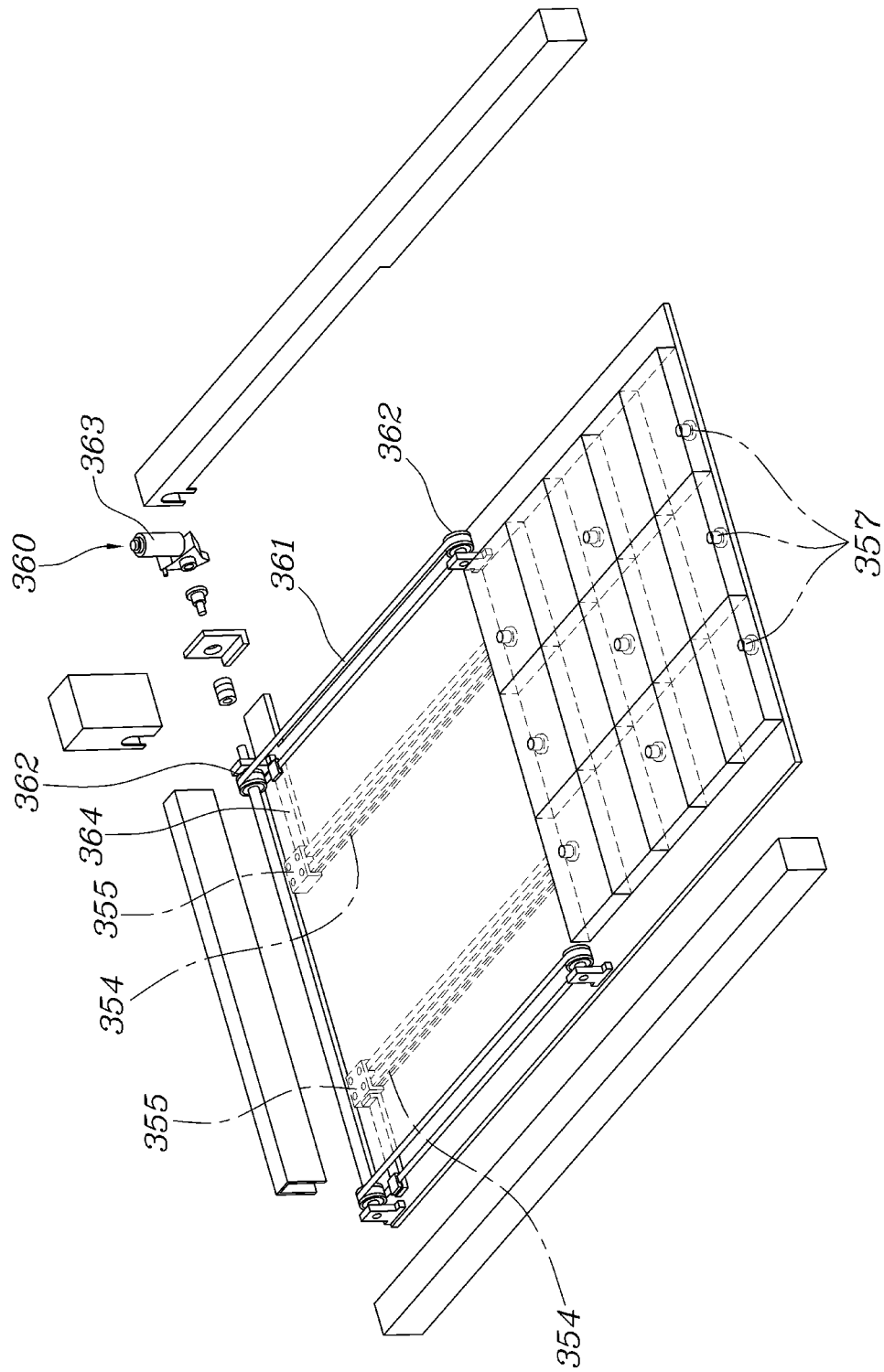
FIG. 4 is an exploded perspective view of a first actuator of a sliding panel of a freight vehicle on which a drone is docked according to an exemplary embodiment of the present disclosure.

FIG. 4 is an exploded perspective view of a first actuator 360 of a sliding panel 350 of a freight vehicle 1000 on which a drone 100 is docked according to an exemplary embodiment of the present disclosure.

The first actuator 360 may include a first belt 361 extending in a direction in which the transfer panel 352 slides, a first pulley 362 coupled to both end portions of the first belt 361, a first driving motor 363 for rotating the first pulley 362, and a connection portion connecting the first belt 361 and the transfer panel 352.

As shown in FIG. 4, the first actuator 360 is provided under the transfer panel 352 and may include a first belt 361 extending in a direction in which the transfer panel 352 slides, a first pulley 312 connected to both end portions of the first belt 361, and a first driving motor 363 for rotating the first pulley 362.

The first driving motor 363 may be operated by receiving electric power from a power source provided in the vehicle and rotate the first pulley 362 as it rotates, and the belt may move as the first pulley 362 rotates.

In the instant case, the first belt 361 may be connected to the transfer panel 352 by the first connection portion 364, and when the first belt 361 moves, the first connection portion 364 is moved so that the transfer panel 352 connected to the first connection portion 364 may slide together.

The above configuration is an exemplary embodiment of the first actuator 360, and in addition to the belt-pulley driving method, a driving method for converting a rotation motion to a linear motion, such as a rack-and-pinion mechanism, may be provided to slide the transfer panel 352.

In an exemplary embodiment of the present invention, a controller is electrically connected to the first actuator 360 to control operation of the first actuator 360.

Figure 5:
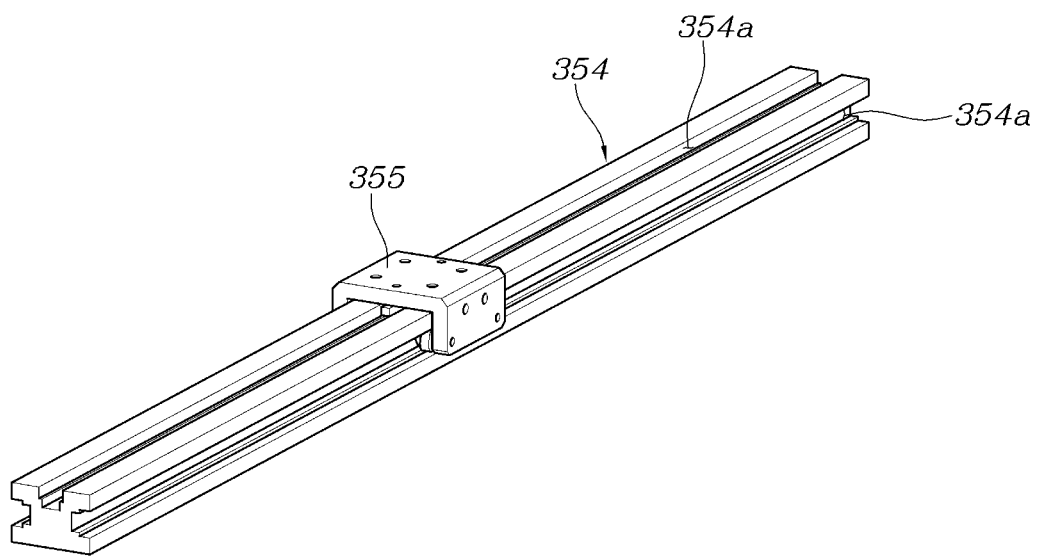
FIG. 5 is a perspective view of a guide rail and a guide portion of a sliding panel of a freight vehicle on which a drone is docked according to an exemplary embodiment of the present disclosure.

FIG. 5 is a perspective view of a guide rail 354 and a guide portion 355 of a sliding panel 350 of a freight vehicle 1000 on which a drone 100 is docked according to an exemplary embodiment of the present disclosure.

The sliding panel 350 may include a guide rail 354 provided under the transfer panel 352 and extending to the open portion 310, and a guide portion 355 slidably connected to the guide rail 354 and including a top portion coupled to the transfer panel 352, and the guide portion 355 may be connected to the first actuator 360 to slide the transfer panel 352.

As shown in FIG. 5, a guide rail 354 extending in the sliding direction of the transfer panel 352 may be provided under the transfer panel 352, and a guide portion 355 slidably connected to the guide rail 354 may be provided, and the upper surface of the guide portion 355 may be connected to the transfer panel 352, stably sliding the transfer panel 352.

The guide rail may have a recess 354a recessed inside and extending in the longitudinal direction thereof, and the guide portion 355 may be provided with a roller 356 connected to be inserted into the recess 354a and to be slidable in the longitudinal direction, and the roller 356 and the recess 354a may be provided on the upper and both sides of the guide rail so that the guide portion 355 can slide on the guide rail.

In the instant case, the guide portion 355 may be connected to the first actuator 360 to move according to the operation of the first actuator 360, and simultaneously slide the transfer panel 352. The guide portion 355 may be substantially connected to the first connection portion 364 of the first actuator 360.

A plurality of guide portions 355 and guide rails 354 may be provided depending on the size of the transfer panel 352, and although a pair of guide portions 355 and guide rails 354 is illustrated in the present disclosure, additional guide portions 355 and guide rails 354 may be further provided depending on the maximum weight of freight loaded on the transfer panel 352 or the size of the transfer panel 352, or one guide portion 355 and guide rail 354 may be provided.

Figure 6:
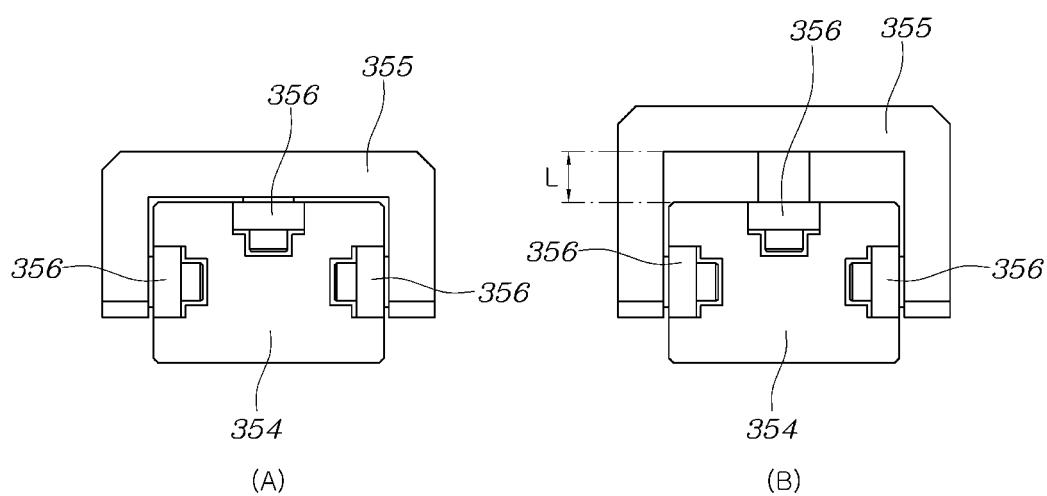
FIG. 6 is a cross-sectional view of a guide rail and a guide portion of a sliding panel of a freight vehicle on which a drone is docked according to an exemplary embodiment of the present disclosure.
Figure 7:
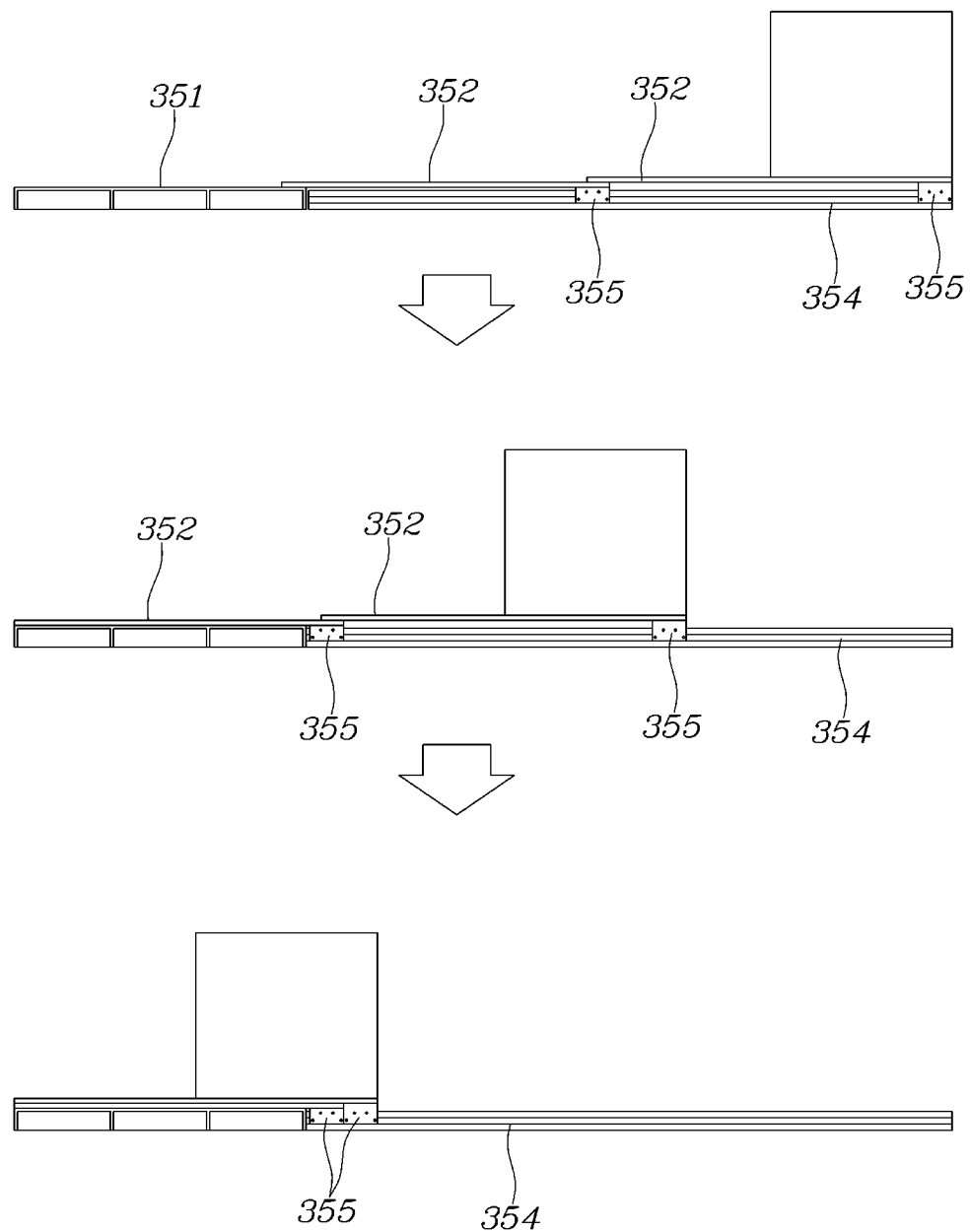
FIG. 7 is a side view exemplarily illustrating the operation of a plurality of transfer panels of a sliding panel provided in a loadspace of a freight vehicle on which a drone is docked according to an exemplary embodiment of the present disclosure.

FIG. 6 is a cross-sectional view of a guide rail 354 and a guide portion 355 of a sliding panel 350 of a freight vehicle 1000 on which a drone 100 is docked according to an exemplary embodiment of the present disclosure, and FIG. 7 is a side view exemplarily illustrating the operation of a plurality of transfer panels 352 of a sliding panel provided in a loadspace 300 of a freight vehicle 1000 on which a drone 100 is docked according to an exemplary embodiment of the present disclosure.

A plurality of transfer panels 352 may be provided side by side, and a plurality of guide portions 355 may be provided to correspond to the number of transfer panels 352. A guide portion 355 located far from the open portion 310 may have a greater height as much as a thickness of the transfer panel 352, and a plurality of first actuators 360 is provided to be respectively connected to the guide portions 355 so that the guide portions 355 may move independently to overlap each other.

A plurality of transfer panels 352 may be provided depending on the size of the loadspace 300, and FIG. 7 shows that two transfer panels 352 are provided as an exemplary embodiment of the transfer panel 352.

The number of transfer panels 352 may be configured according to the depth of the loadspace 300, and when a plurality of transfer panels 352 is provided, the transfer panel can stably slide to transfer the freight loaded on the transfer panel 352 to the open portion 310.

As shown in FIG. 7, in the case where two transfer panels 352 are provided, a transfer panel 352 adjacent to the fixed panel 351 may preferentially slide to overlap the fixed panel 351, and then a transfer panel 352 located inside the loadspace 300 may slide to further overlap the same.

In the instant case, for the present structure, the guide portions 355 provided to be slidable on the guide rail 354 and including a top surface coupled to the transfer panel 352 may have different heights.

As shown in FIG. 6, the guide portion 355 in (A) and the guide portion 355 in (B) may be differently provided by a length L, and the guide portion 355 in (A) may be coupled to the transfer panel 352 adjacent to the fixed panel 351, and the guide portion 355 in (B) may be coupled to the transfer panel 352 on the internal side of the loadspace 300.

The guide portion 355 in (A) and the guide portion 355 in (B) may have a difference by a length L in order for the transfer panel 352 on the internal side of the loadspace 300 to overlap the upper surface of the transfer panel 352 adjacent to the fixed panel 351, and the length L may be the thickness of the transfer panel 352.

Through the present structure, the transfer panels 352 may be configured as a multi-stage structure, and may be applied to various types of vehicles.

Figure 9:
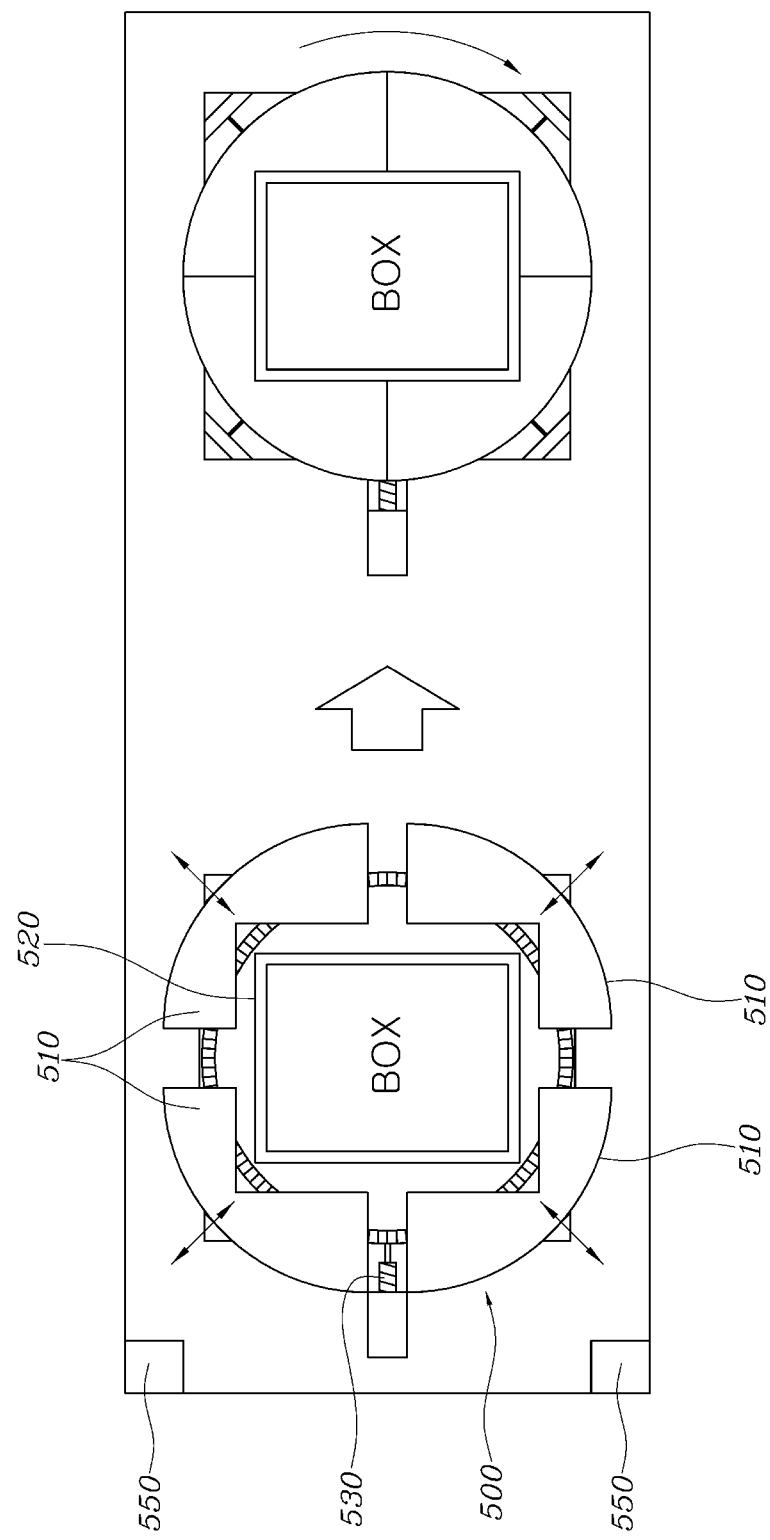
FIG. 9 is a view exemplarily illustrating the operation of a drone station of a freight vehicle on which a drone is docked according to an exemplary embodiment of the present disclosure.
Figure 10:
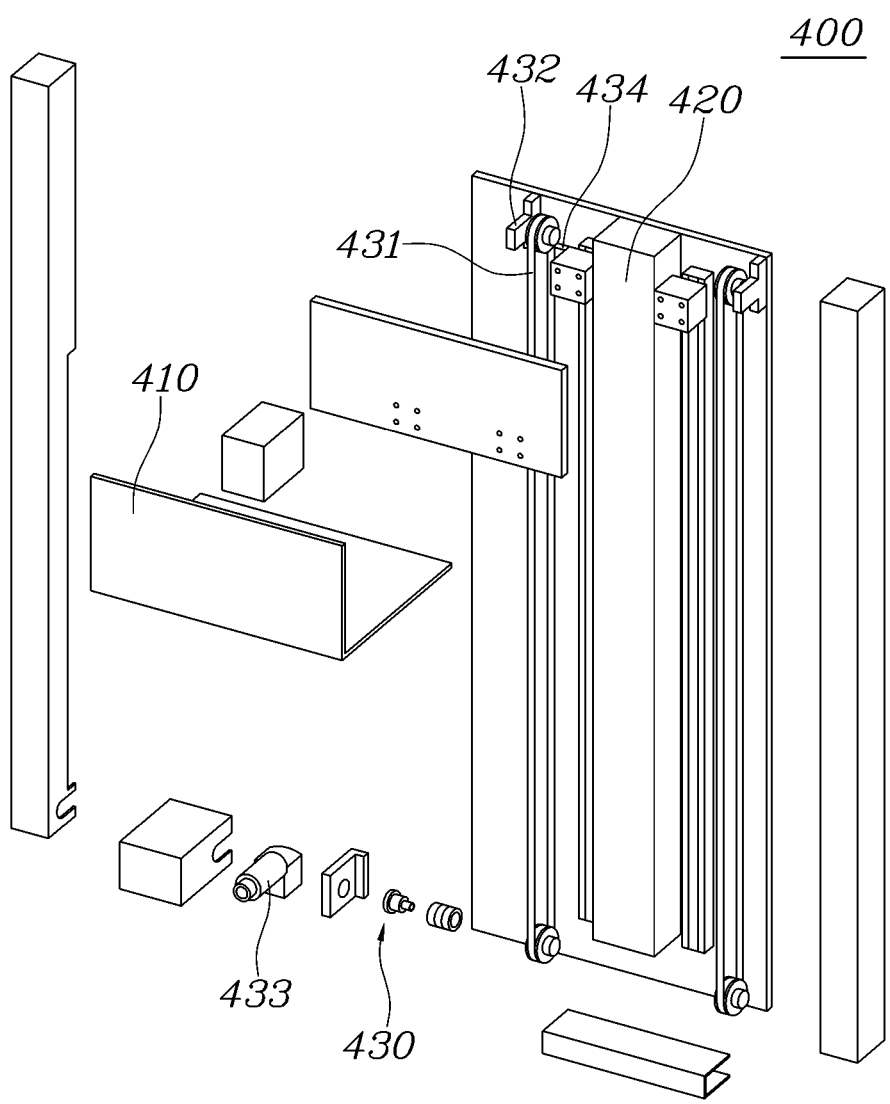
FIG. 10 is an exploded perspective view of a transfer device of a freight vehicle on which a drone is docked according to an exemplary embodiment of the present disclosure.

FIG. 9 is a view exemplarily illustrating the operation of a drone station of a freight vehicle 1000 on which a drone 100 is docked according to an exemplary embodiment of the present disclosure, and FIG. 10 is an exploded perspective view of a transfer device 400 of a freight vehicle 1000 on which a drone 100 is docked according to an exemplary embodiment of the present disclosure.

The transfer device 400 may include a driving rail 420 extending in the vertical direction, a support panel 410 slidably connected to the driving rail 420 and supporting freight to move in the vertical direction, and a second actuator 430 for moving the support panel 410 along the driving rail 420.

Referring further to FIG. 10, the transfer device 400 may include a support panel 410 that supports freight to be transferred from the bottom portion of the vehicle to the roof, and a delivery driver may move the freight located in the loadspace 300 to the support panel 410, moving the freight on the support panel 410 to the roof.

In the instant case, the support panel 410 may be slidably connected to the driving rail 420 which is coupled to the vehicle and extends in the vertical direction, and a second actuator 430 coupled to the support panel 410 and the driving rail 420 to slide the support panel 410 in the direction in which the driving rail 420 extends may be provided so that the support panel 410 may slide when the second actuator 430 operates, moving the freight in the vertical direction.

The second actuator 430 may include a second belt 431 extending in the direction in which the second rail extends, a second pulley 432 coupled to both end portions of the second belt 431, a second driving motor 433 for rotating the second pulley 432, and a second connection portion 434 connecting the second belt 431 and the support panel 410.

As an exemplary embodiment of the second actuator 430 as shown in FIG. 10, a second belt 431 extending parallel to the driving rail 420 on the side of the driving rail 420 and a second pulley 432 connected to both end portions of the second belt 431 and rotating to move the second belt 431 may be provided, and as the second driving motor 433 including a rotation shaft connected to the second pulley 432 operates, the second pulley 432 may be rotated, moving the second belt 431.

The second belt 431 may be connected to the support panel 410 through the second connection portion 434 to move up and down as the second driving motor 433 is operated, transferring freight from the bottom portion of the vehicle to the upper portion to load the same on the drone 100.

In an exemplary embodiment of the present invention, the second driving motor 433 is electrically connected to the controller to control operation of the second driving motor 433.

The above configuration is an exemplary embodiment of the second actuator 430, and the second actuator 430 may be configured in a form of various driving devices that move the support panel 410 in the vertical direction.

A drone docking station 500 connected to the upper end portion of the transfer panel 352, mounted on the roof of the vehicle so that the drone 100 is accommodated thereon, configured as a plurality of panels surrounding the transfer device 400, and configured to slide outwards and rotate around the center portion may further included.

As shown in FIG. 8, a drone docking station 500 on which the drone 100 is accommodated may be provided at the upper end portion of the transfer device 400, and the transfer device 400 may pass through the center portion of the drone docking station 500 to slide the support panel 410 in the vertical direction.

The drone docking station 500 may be formed of a plurality of panels so that the plurality of panels extends outwards to expand a seating space when the drone 100 is accommodated on the drone docking station 500, and the drone 100 may rotate after being accommodated so that the freight loaded on the support panel 410 may match the drone 100, easily loading the freight on the drone 100.

The drone docking station 500 may include a base panel 520 of which the center portion is connected to the transfer device 400 and connected to the roof panel of the vehicle to rotate about the transfer device 400, and guide panels 510, on which the drone 100 is accommodated, including a plurality of panels and connected to the upper portion of the base panel 520 to slide outwards.

As shown in FIG. 9, the drone docking station 500 may be provided with a base panel 520 rotatably connected to the roof panel and guide panels 510 connected to the upper portion of the base panel 520 to slide outwards from the center portion thereof.

The base panel 520 may have an opening at the center portion thereof in order for the support panel 410 sliding in the vertical direction in the transfer device 400 and the freight supported on the support panel 410 to pass therethrough, and the guide panels 510 connected to the upper portion of the base panel 520 to slide outwards may be configured as a plurality of panels surrounding the external portion of the opening area at the center portion of the base panel 520.

The plurality of guide panels 510 may be connected to the base panel 520 to slide outwards and may slide outwards from the center portion of the base panel 520 before the drone 100 is accommodated to expand the seating area of the drone 100 so that the drone 100 may be stably accommodated on the guide panels 510 even if there is an error in the seating position due to external factors when the drone 100 is accommodated, and the guide panels 510 may slide to the original positions after the drone 100 is accommodated so that the center portion of the drone 100 matches the center portion of the base panel 520.

Thereafter, the base panel 520 may rotate around the center portion thereof so that the drone 100 matches freight located in the center portion in the direction thereof.

In the instant case, the drone docking station 500 may include a first driving device 530 for rotating the base panel 520 and a second driving device 540 for sliding the guide panel 510.

The first driving device 530 including a driving motor may connect the base panel 520 and the guide panel 510 and is provided to each guide panel 510 so that the guide panel 510 is configured to slide outwards from the center portion of the base panel 520, and as an exemplary embodiment of the present disclosure, a screw nut connected to the guide panel 510 may slide according to the rotation of a lead screw, and the lead screw may be engaged with a circular rack gear so that the circular rack gear is rotated according to the rotation of the driving motor, sliding the guide panel 510 by the operation of one driving motor.

Furthermore, in the second driving device 540, a driving motor provided on the roof panel to rotate the base panel 520 may engage with a rack gear so that the base panel 520 may rotate according to the rotation of the driving motor. In the instant case, a plurality of detection sensors 550 provided on the side of the drone docking station 500 may detect the seating position of the drone 100, and based on the same, determine the rotation angle of the base panel 520, controlling the operation of the driving motor.

In an exemplary embodiment of the present invention, the driving motors of the first driving device 530 and the second driving device 540 are electrically connected to the controller to control operation of the driving motors of the first driving device 530 and the second driving device 540.

Figure 11:
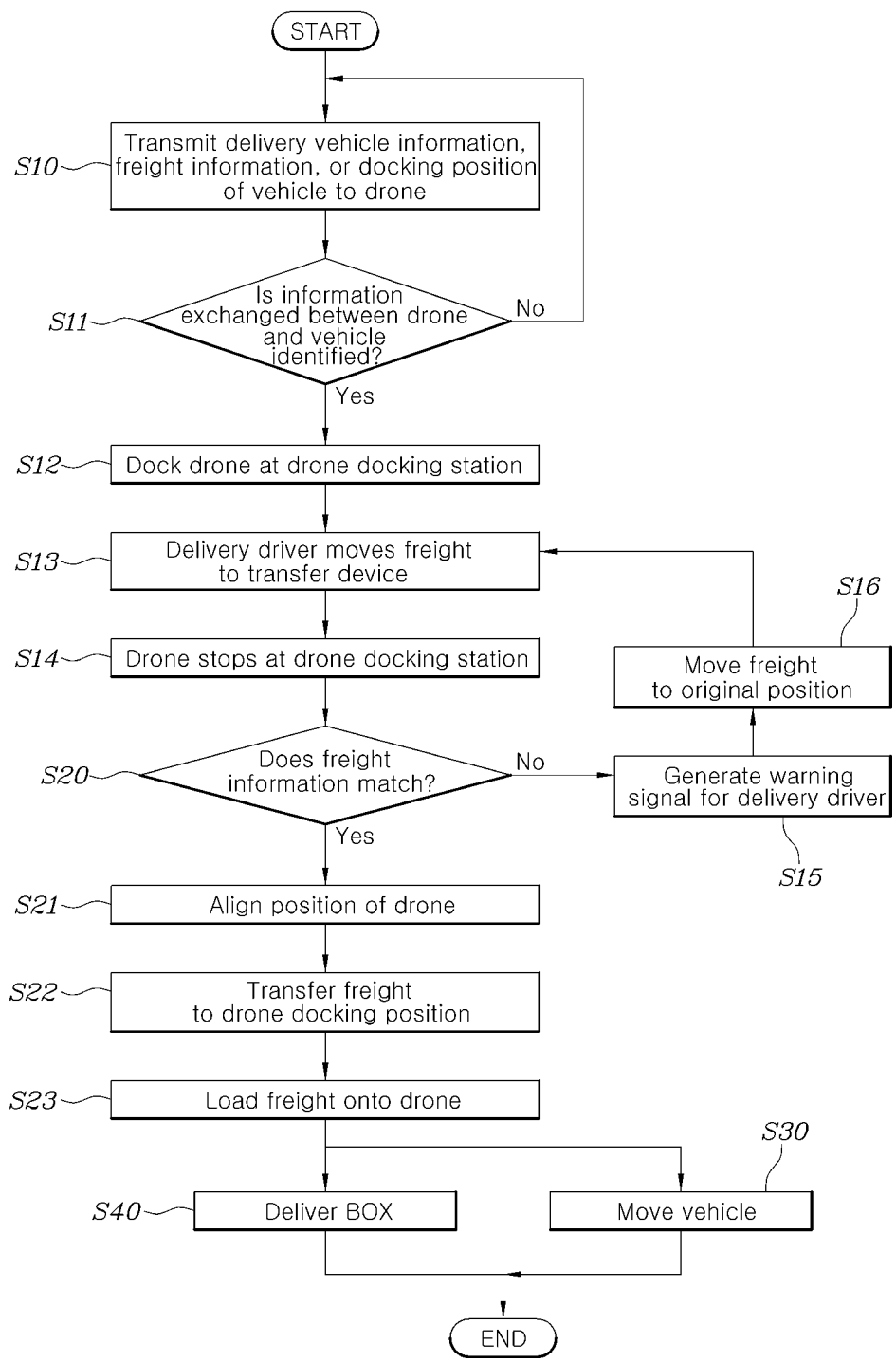
FIG. 11 is a flowchart illustrating a method of controlling a logistics system using a freight vehicle on which a drone is docked according to an exemplary embodiment of the present disclosure.

FIG. 11 is a flowchart illustrating a method of controlling a logistics system using a freight vehicle 1000 on which a drone 100 is docked according to an exemplary embodiment of the present disclosure.

An exemplary embodiment of a freight vehicle 1000 on which the drone 100 is docked according to an exemplary embodiment of the present disclosure will be described with reference to FIG. 11.

A method of controlling a logistics system using a freight vehicle 1000 on which a drone 100 is docked according to an exemplary embodiment of the present disclosure may include: a step S10 of transmitting delivery vehicle information, freight information, or a docking position of a vehicle from a server to a drone 100; a step S11 of identifying matching between the drone 100 and the vehicle; a step S12 of docking the drone 100 on the transfer device 400 of a roof of the vehicle; and a step S22 of elevating the transfer device 400 of the vehicle to the roof of the vehicle if the matching between the drone 100 and the vehicle is identified.

In the step S11 of identifying the matching between the drone 100 and the vehicle, the docking position of the drone 100 may be transmitted to the drone in consideration of the size of freight loaded on the drone 100 when the drone 100 is docked at a drone docking station 500.

In the transmission step S10, an external server for managing the logistics system may transmit delivery vehicle information to be docked to the drone 100, and convert the position where docking is performed with the delivery vehicle and information related to the freight to be loaded after docking into IDs and transmit the same to the drone 100.

After that, in the step S1 1 of identifying the matching between the drone 100 and the vehicle, the freight vehicle 1000 and the drone 100 may wirelessly communicate with each other such that the information received from the drone 100 matches the information possessed by the freight vehicle 1000, and if the information matches each other, the drone 100 may be docked at the drone docking station 500 provided in the freight vehicle 1000 (S12).

Furthermore, in the step S11 of identifying the matching between the drone 100 and the vehicle, if the matching between the drone 100 and the freight vehicle 1000 is confirmed, information related to the drone may be updated in the external server.

Afterwards, a delivery driver may move the freight loaded in the loadspace 300 of the freight vehicle 1000 to the transfer device 400 (S13), and the drone 100 may stop and wait at the drone docking station 500 after docking (S14).

After the freight is loaded on the transfer device 400, a step S20 of matching the freight information to the freight information received from the drone 100 is executed, and a step S21 of aligning the drone 100 by controlling the drone docking station 500 such that the drone 100 corresponds to the position of the freight transferred by the transfer device 400 if the matching is identified after the docking step may be further included.

A step S15 of generating a warning signal to a delivery driver if the matching is not identified in the step S20 of matching the freight information to the freight information received from the drone 100, and a step S16 of controlling the transfer device 400 to move the freight to the original position may be included.

A step S20 of identifying whether or not the freight information received from the drone 100 after the docking step S12 matches freight information, and a step S23 of loading the freight onto the drone 100 if the freight information matches each other in the step of identifying the matching between the freight information may be further included.

After the step S20 of identifying the matching, a step of transferring the freight to the roof through the transfer device 400 may be executed.

A step S40 of delivering the freight BOX by the drone 100 after the step S23 of loading the freight onto the drone 100, and a step S30 of moving the freight vehicle 1000 by the delivery driver may be further included.

The drone 100 that has completed delivery of the freight may check the remaining amount of battery, transmit information related to the remaining amount of battery to the external server, and receive a subsequent control signal from the external server according to the remaining amount of battery.

Upon receiving the control signal from the external server, the drone 100 may receive information related to another freight vehicle according to the remaining amount of battery and deliver freight of another freight vehicle, or may return to a management base for charging and management of the drone 100 and perform charging.

Furthermore, the freight vehicle 1000, which has delivered the freight through the drone 100, may move to deliver other freights left inside the freight vehicle 1000 through another drone, or may collect the freight collected by another drone and move to a distribution center.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle on which a drone is selectively docked, the vehicle comprising:
   a transfer device provided in the vehicle and configured to move up and down between an internal space of the vehicle and a roof of the vehicle to receive freight from the drone through the roof of the vehicle or transfer freight to the drone;
   a loadspace separated, as a portion of the internal space of the vehicle, from a space where the transfer device is provided and including an open portion formed on a side or a rear of the vehicle, and onto which the freight is loaded; and
   a drone docking station connected to an upper end portion of the transfer device, mounted on the roof of the vehicle so that the drone is selectively accommodated on the drone docking station.

2. The vehicle of claim 1,
   wherein the loadspace is divided into a plurality of spaces by partitions, and wherein the open portion is formed on the side or the rear of the vehicle in each space.

3. The vehicle of claim 2,
   wherein the partitions include a first partition extending in a horizontal direction of the vehicle to form the space in which the transfer device is provided and a second partition spaced from the first partition in a front and rear direction of the vehicle and extending in the horizontal direction of the vehicle, and
   wherein the loadspace includes a first space formed between the first partition and the second partition and including an open portion formed on the side of the vehicle, and a second space partitioned by the second partition and extending toward the rear of the vehicle to have an open portion formed on the rear of the vehicle.

4. The vehicle of claim 1, further including a sliding panel including a transfer panel provided to be slidable to the inside of the loadspace on a bottom thereof, a fixed panel provided on the bottom adjacent to the open portion, and a first actuator configured to slide the transfer panel to an upper portion of the fixed panel to overlap the fixed panel.

5. The vehicle of claim 4, further including a support wall extending upwards and provided at an internal end portion of the transfer panel,
   wherein, when the transfer panel slides, the support wall is moved together with the transfer panel to move the freight on the transfer panel.

6. The vehicle of claim 4, wherein the first actuator includes a first belt extending in a direction in which the transfer panel slides, a first pulley coupled to first and second end portions of the first belt, a first driving motor configured to rotate the first pulley, and a connection portion connecting the first belt and the transfer panel.

7. The vehicle of claim 4,
   wherein the sliding panel includes a guide rail provided under the transfer panel and extending to the open portion, and a guide portion slidably connected to the guide rail and including a top portion coupled to the transfer panel, and
   wherein the guide portion is connected to the first actuator to slide the transfer panel.

8. The vehicle of claim 7,
   wherein a plurality of transfer panels is provided side by side,
   wherein a plurality of guide portions is provided to correspond to a number of the transfer panels,
   wherein a guide portion located far from the open portion has a greater height as much as a thickness of the transfer panel, and
   wherein a plurality of first actuators is provided to be respectively connected to the guide portions so that the guide portions move independently to overlap each other.

9. The vehicle of claim 1, wherein the transfer device includes a driving rail extending in a vertical direction, a support panel slidably connected to the driving rail and supporting the freight to move in a vertical direction, and a second actuator configured to move the support panel along the driving rail.

10. The vehicle of claim 9, wherein the second actuator includes a second belt extending in a direction in which a second rail extends, a second pulley coupled to first and second end portions of the second belt, a second driving motor configured to rotate the second pulley, and a second connection portion connecting the second belt and the support panel.

11. The vehicle of claim 1,
    wherein the drone docking station is configured as a plurality of panels surrounding the transfer device, and configured to slide inwards or outwards and rotate around a center portion of the drone docking station.

12. The vehicle of claim 11, wherein the drone docking station further includes:
    a base panel of which a center portion thereof is connected to the transfer device and connected to a roof panel of the vehicle to rotate about the transfer device, and
    guide panels connected to an upper portion of the base panel to slide inwards or outwards, wherein the drone is configured to be accommodated in the guide panels.

13. The vehicle of claim 12, wherein the drone docking station further includes:
    a first driving device coupled to the base panel and configured to rotate the base panel; and
    a second driving device coupled to the guide panels and configured to slide the guide panels.

14. The vehicle of claim 13, wherein the second driving device incudes:
    a driving motor;
    a lead screw;
    a screw nut connected to the guide panels and engaged to the lead screw, wherein the screw nut slides according to rotation of the lead screw; and
    a circular rack gear, with which the lead screw is engaged so that the circular rack gear is rotated according to rotation of the driving motor, for sliding the guide panels by the rotation of the driving motor.

15. A method of controlling a logistics system using the vehicle of claim 1, the method including:
transmitting delivery vehicle information, freight information, or a docking position of the vehicle from a server to the drone;
identifying matching between the drone and the vehicle;
docking the drone on the transfer device of the roof of the vehicle; and
elevating the transfer device of the vehicle to the roof of the vehicle when the matching between the drone and the vehicle is identified.

16. The method of claim 15, further including:
aligning the drone by controlling the drone docking station of the vehicle so that the drone is aligned to correspond to a position of the freight transferred by the transfer device after the docking.

17. The method of claim 16, further including:
identifying whether freight information received from the drone after the docking matches the transmitted freight information; and
loading the freight onto the drone when the received freight information and the transmitted freight information match each other in identifying the matching between the received freight information and the transmitted freight information.

18. The method of claim 16, further including:
identifying whether freight information received from the drone after the docking matches the transmitted freight information; and
generating a warning signal when the received freight information and the transmitted freight information do not match each other in identifying the matching between the received freight information and the transmitted freight information.

* * * * *